L. SNIEREK.
SPRING WHEEL.
APPLICATION FILED JUNE 28, 1920.

1,415,006.

Patented May 2, 1922.
2 SHEETS—SHEET 1.

L. SNIEREK.
SPRING WHEEL.
APPLICATION FILED JUNE 28, 1920.
1,415,006.
Patented May 2, 1922.
2 SHEETS—SHEET 2.
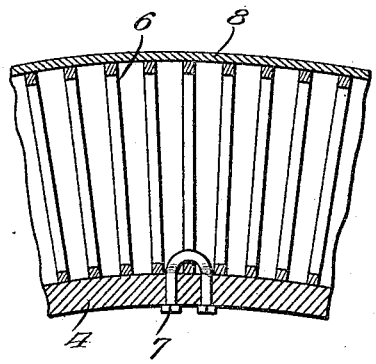
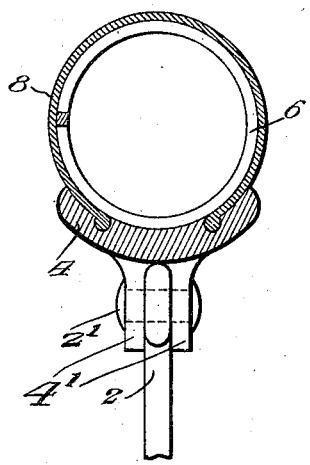
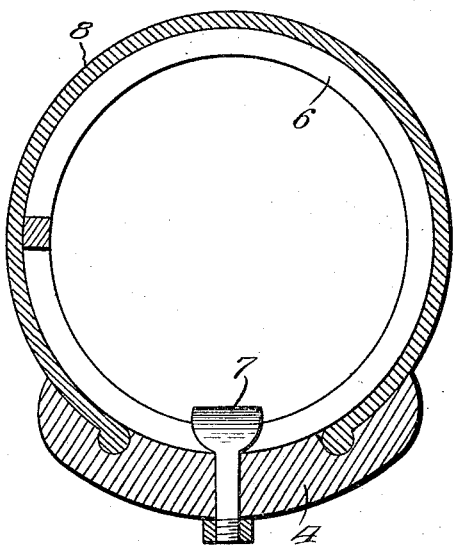
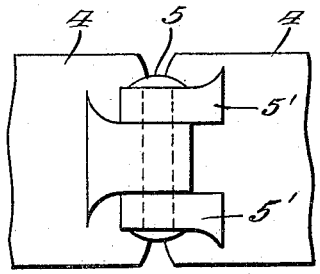
WITNESS:
Edwin F. McKee
L. B. Middleton
L. Snierek INVENTOR
BY Victor J. Evans
ATTORNEY

UNITED STATES PATENT OFFICE.

LUDWICK SNIEREK, OF ELIZABETH, NEW JERSEY.

SPRING WHEEL.

1,415,006.  Specification of Letters Patent.  Patented May 2, 1922.

Application filed June 28, 1920. Serial No. 392,168.

*To all whom it may concern:*

Be it known that I, LUDWICK SNIEREK, a citizen of Poland, residing at Elizabeth, in the county of Union and State of New Jersey, have invented new and useful Improvements in Spring Wheels, of which the following is a specification.

This invention relates to improvements in spring wheels, the principal object of the invention being to form the rim of a wheel of sections supported by steel wire spokes having integral spring portions.

Another object of the invention is to provide a tire ring made in the form of a coiled spring engaging the sectional rim with means for connecting the ring to said sections.

This invention also consists in certain other features of construction and in the combination and arrangement of the several parts, to be hereinafter fully described, illustrated in the accompanying drawings and specifically pointed out in the appended claim.

In describing the invention in detail, reference will be had to the accompanying drawings, wherein like characters denote corresponding parts throughout the several views, and in which:—

Figure 2 is an enlarged fragmentary sectional view of the tire.

Figure 3 is a cross section on line 3—3 of Figure 1.

Figure 4 is an enlarged transverse sectional view showing how the coiled spring ring is connected with the sections.

Figure 5 is an enlarged fragmentary plan view showing how the sections are connected together.

Figure 1:
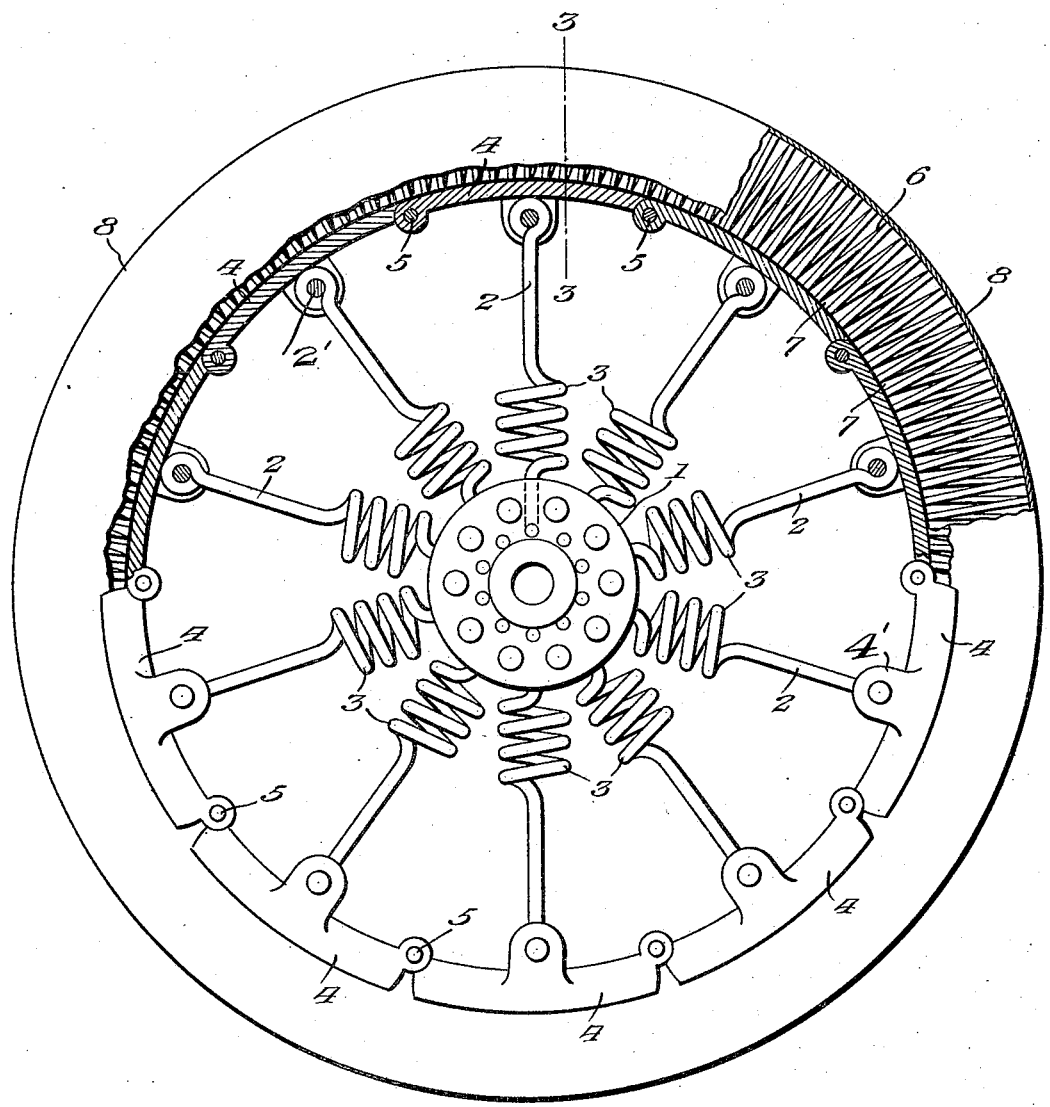
Figure 1 is a side view of the invention partially in section.

In these views the numeral 1 indicates the hub of the wheel to which steel wire spokes 2 are connected. Each spoke is provided with a helical spring element 3, formed by coiling a portion of the spoke wire.

The rim is made of a plurality of arcuate sections 4 which are connected with the spokes, by pivot pins 2' passing through the forks of lugs 4' formed with the rim sections and eyes in the outer ends of their corresponding spokes. Each rim section is hingedly attached to the adjacent section, by pivot pins 5 passing through extending end lugs arranged co-actingly in the manner of a hinge as shown in Figure 1.

The outer faces of the sections are grooved longitudinally to receive the ring 6, which is made in the form of a coiled spring, from rectangular wire 6' and is connected with the sections 4 by means of clips 7, engaging at spaced intervals with the coil 6, which is enclosed in a casing or shoe 8.

It is thought from the foregoing description that the advantages and novel features of the invention will be readily apparent.

It is to be understood that changes may be made in the construction and in the combination and arrangement of the several parts, provided that such changes fall within the scope of the appended claim:

A spring wheel comprising a hub, single radial spokes carried thereby and having integral helically coiled portions to form springs closely adjacent said hub, a rim comprising a plurality of articulated sections, pivotally secured to the outer ends of individual spokes, and an endless tread surrounding said rim.

In testimony whereof I affix my signature.

LUDWICK SNIEREK.